(12) United States Patent
Chiba

(10) Patent No.: US 12,115,992 B2
(45) Date of Patent: Oct. 15, 2024

(54) UTILITY VEHICLE

(71) Applicant: KAWASAKI MOTORS, LTD., Hyogo (JP)

(72) Inventor: Junji Chiba, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 360 days.

(21) Appl. No.: 17/809,138

(22) Filed: Jun. 27, 2022

(65) Prior Publication Data
US 2023/0415747 A1 Dec. 28, 2023

(51) Int. Cl.
| | |
|---|---|
| B60W 30/18 | (2012.01) |
| B60G 17/016 | (2006.01) |
| B60G 17/0195 | (2006.01) |
| B60K 23/08 | (2006.01) |
| B60K 26/02 | (2006.01) |
| B60T 7/12 | (2006.01) |
| B60W 10/04 | (2006.01) |
| B60W 10/12 | (2012.01) |
| B60W 10/184 | (2012.01) |
| B60W 10/22 | (2006.01) |
| B60W 30/182 | (2020.01) |

(52) U.S. Cl.
CPC ..... *B60W 30/18181* (2013.01); *B60G 17/016* (2013.01); *B60G 17/0195* (2013.01); *B60K 23/08* (2013.01); *B60K 26/02* (2013.01); *B60T 7/12* (2013.01); *B60W 10/04* (2013.01); *B60W 10/12* (2013.01); *B60W 10/184* (2013.01); *B60W 10/22* (2013.01); *B60W 30/182* (2013.01); *B60K 2023/0858* (2013.01); *B60W 2520/10* (2013.01); *B60W 2520/28* (2013.01); *B60W 2556/50* (2020.02)

(58) Field of Classification Search
CPC .... B60W 10/04; B60W 10/12; B60W 10/184; B60W 10/22; B60W 30/18181; B60W 30/182; B60W 2556/50; B60W 2520/10; B60W 2520/28; B60G 17/016; B60G 17/0195; B60K 23/08; B60K 26/02; B60K 2023/0858; B60T 7/12
See application file for complete search history.

(56) References Cited

U.S. PATENT DOCUMENTS

| | | | | |
|---|---|---|---|---|
| 6,105,703 | A * | 8/2000 | Kuroda | B60K 17/35 701/87 |
| 8,790,217 | B1 * | 7/2014 | Bowers | F16H 48/20 477/35 |
| 8,801,561 | B1 | 8/2014 | Kii | |
| 2015/0073679 | A1 * | 3/2015 | Darnell | B60W 10/06 701/84 |
| 2016/0001654 | A1 * | 1/2016 | Nolte | B60K 23/04 701/69 |

* cited by examiner

*Primary Examiner* — Edwin A Young
(74) *Attorney, Agent, or Firm* — Wenderoth, Lind & Ponack, L.L.P.

(57) ABSTRACT

A utility vehicle includes a stack sensor for detecting whether a stack has occurred in a vehicle, and a controller. When a differential device is in an open state, the controller determines the presence or absence of a stack based on a detection result by the stack sensor. When it is determined that a stack has occurred, the controller activates the brake device to reduce a rotation speed of a stack wheel, which is a wheel idling due to the stack.

18 Claims, 11 Drawing Sheets

UTILITY VEHICLE

BACKGROUND OF THE INVENTION

Field of the Invention

The present invention relates to a utility vehicle.

Related Art

U.S. Pat. No. 8,801,561 B1 discloses a utility vehicle including a differential device interposed between drive wheels. When one drive wheel idles on an off road, the utility vehicle may be stuck and hindered from traveling.

SUMMARY OF THE INVENTION

An object of the present disclosure is to provide a utility vehicle capable of assisting early cancellation of a stack.

One aspect of the present disclosure provides a utility vehicle including: a plurality of wheels; a differential device configured to be switchable between an open state in which a driving force is distributed to the plurality of wheels and a locked state in which the plurality of wheels are directly connected; a brake device that brakes the plurality of wheels; a stack sensor for detecting whether a stack is generated in the vehicle; and a controller, in which the controller is configured to: determine whether a stack is generated in the vehicle based on a detection result of the stack sensor when the differential device is in the open state; and operate, when it is determined that the stack has occurred, at least the brake device to decrease a rotation speed of a stack wheel which is a wheel that is idling.

According to the above configuration, when determining that a stack has occurred in the vehicle, the controller brakes the stack wheel to stop idling. Therefore, the idling period is shortened regardless of the stack recognition by the driver. By shortening the idling period, the time from the start of the stack to the operation for stack cancellation performed after the idling stop is shortened. Therefore, it is possible to assist quick cancellation from the stack.

DETAILED DESCRIPTION OF THE EMBODIMENTS

Figure 1:
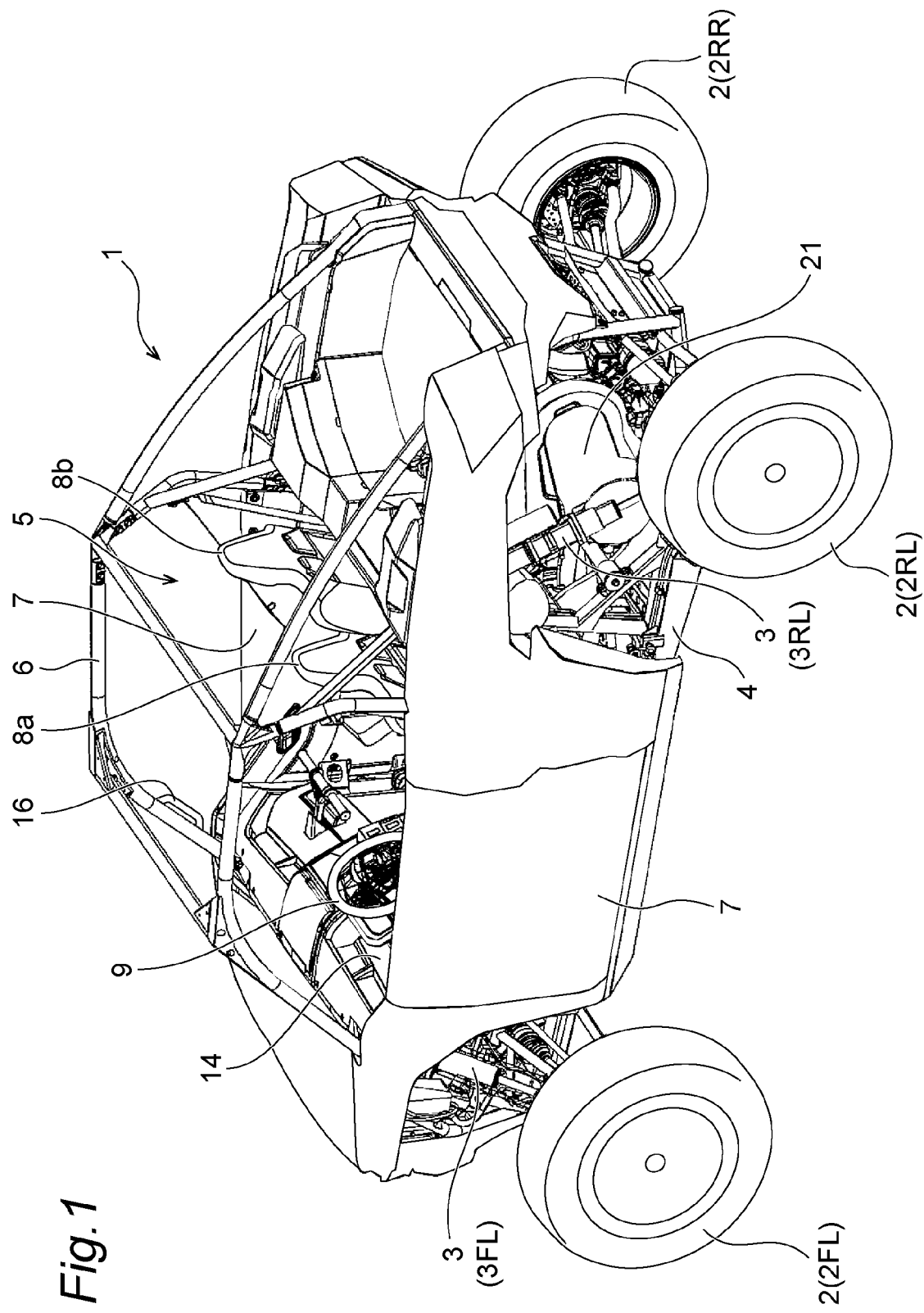
FIG. 1 is a perspective view of a utility vehicle according to a first embodiment.

Embodiments will be described with reference to the accompanying drawings. The same or corresponding elements are denoted by the same reference numerals throughout the drawings, and overlapping of the detailed description will be omitted. The direction is based on a direction viewed from a driver on a driver seat.

Referring to FIG. 1, a utility vehicle 1 is used for various purposes such as leisure purposes such as trekking in a rocky area, a desert or a forest, and agricultural work purposes such a spraying of agricultural chemicals or feed on a farm. The utility vehicle 1 includes four wheels 2 including a front right wheel 2FR, a front left wheel 2FL, a rear right wheel 2RR, and a rear left wheel 2RL. In the present specification and the drawings, the symbols "FR", "FL", "RR", and "RL" added to the reference numerals of the elements corresponding to the wheels 2 correspond to the front right wheel, the front left wheel, the rear right wheel, and the rear left wheel, respectively.

A low pressure tire is mounted on each wheel 2. The low pressure tire is also referred to as a balloon tire, and is filled with a relatively low air pressure of about 200 kPa. Each wheel 2 is suspended on a vehicle body frame 4 via a corresponding suspension device 3. Each suspension device 3 is configured to have a variable stroke.

A riding space 5 is formed between the front wheels 2FR and 2FL and the rear wheels 2RR and 2RL in a front-rear direction. The riding space 5 is surrounded by a roll over protective structure (ROPS) 6 and a pair of doors 7. In the riding space 5, two seats 8a and 8b are arranged side by side. One of them is a driver seat 8a for a driver, and the other is a passenger seat 8b for a passenger.

A plurality of operation elements are provided around the driver seat 8a. The operation elements are disposed within a range that the driver on the driver seat 8a can reach in order to be operated by the driver on the driver seat 8a. The operation elements include, for example, a steering wheel 9, an accelerator pedal 10 (see FIG. 2), a brake pedal 11 (see FIG. 2), a parking lever (not shown), a shift lever (not shown), a differential lock switch 12 (see FIG. 2), and a two-wheel drive/four-wheel drive switch 13 (see FIG. 2).

An instrument panel 14 is provided in front of the driver seat 8a. The instrument panel 14 is provided with an information presentation device 15 (see FIG. 3) that presents information to the driver. The information presentation device 15 may present information by appealing to the driver's vision such as in a meter, a lamp, and a liquid crystal panel. The information presentation device 15 may present information by audibly appealing such as in a speaker and a buzzer. In the following description, unless otherwise specified, the information presentation device 15 is assumed to be a liquid crystal panel capable of displaying character information and image information.

Around the passenger seat 8b, a grip 16 is provided which is gripped by a fellow passenger in order for the fellow passenger to stabilize his/her posture. The grip 16 is attached, for example, to a panel in front of the passenger seat 8b, a ROPS 6, or a center console (not illustrated) at a place on the passenger seat 8b where a hand of a passenger easily reaches.

Figure 2:
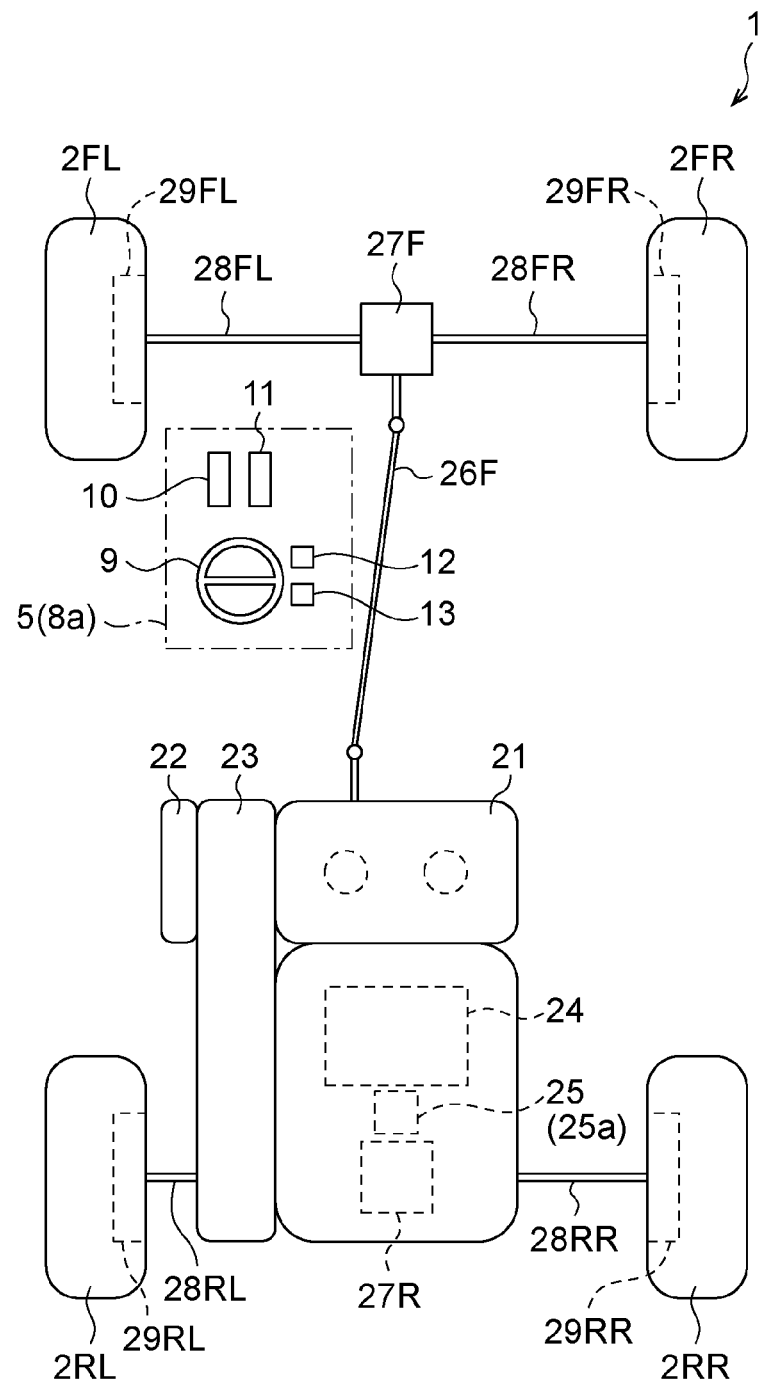
FIG. 2 is a conceptual diagram of a drive system of the utility vehicle shown in FIG. 1.
Figure 3:
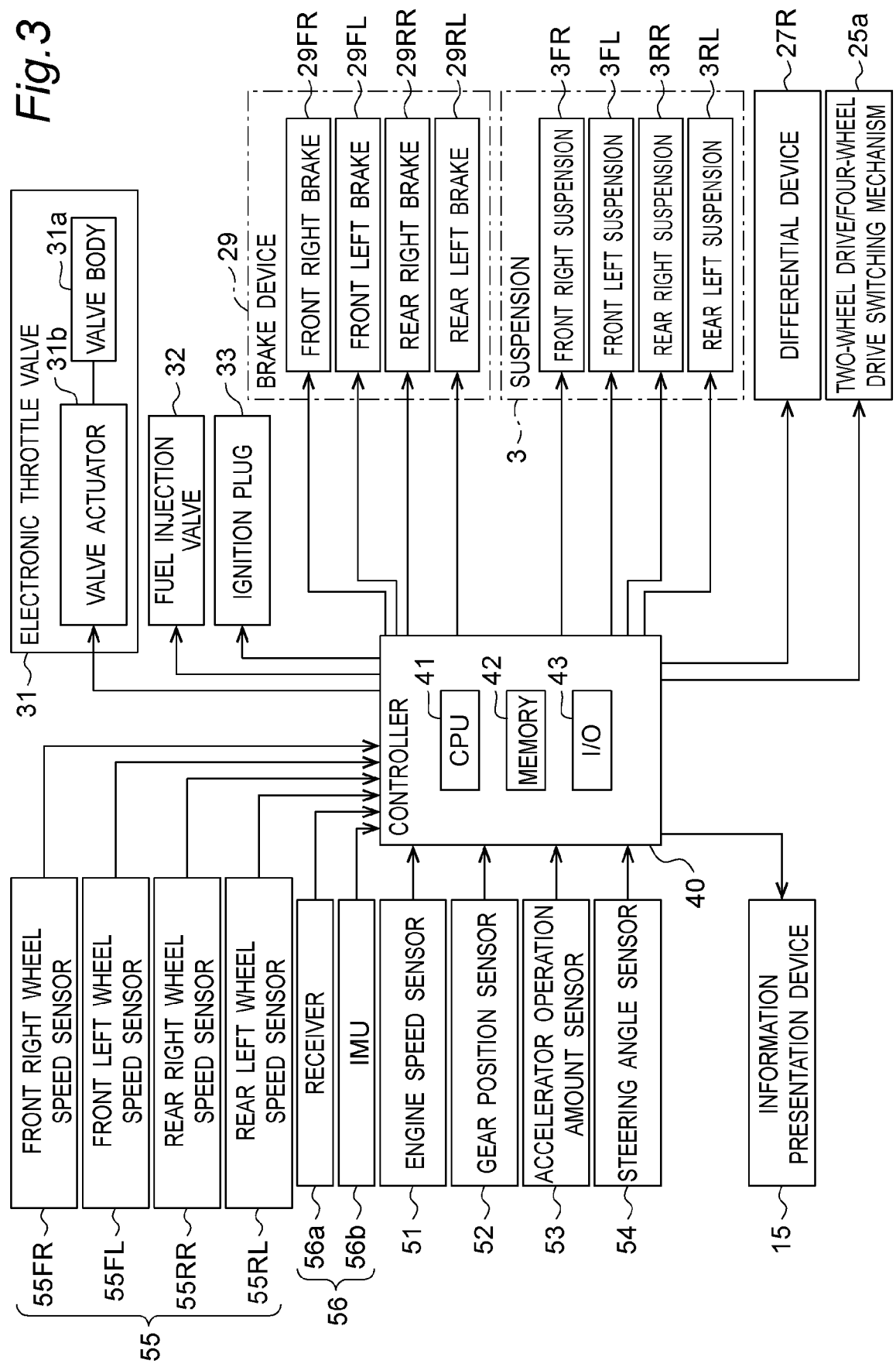
FIG. 3 is a conceptual diagram of a control system of the utility vehicle shown in FIG. 1.

Referring to FIGS. 2 and 3, the utility vehicle 1 includes an engine 21, a clutch 22, a continuously variable transmission (CVT) 23, a transmission 24, a power take-out unit 25, a front propeller shaft 26F, front and rear differential devices 27F and 27R, front axles 28FR and 28FL, rear axles 28RR and 28RL, and a brake device 29.

The engine 21 is an example of a driving source that generates a driving force for rotationally driving the wheels 2. The number and arrangement of cylinders are not particularly limited. The engine 21 is, for example, a multi-cylinder gasoline engine, and the utility vehicle 1 is provided with a throttle valve that changes an opening degree of an intake passage, a fuel injection valve 32 that injects fuel into a cylinder, and an ignition plug 33 that ignites an air-fuel mixture of intake air and fuel. In the present embodiment, the throttle valve is an electronic throttle valve 31, and includes a valve bod 31a that changes the opening degree of the intake passage and a valve actuator 31b that drives the valve body 31a. Combustion of the air fuel mixture rotates an engine output shift (not shown) to generate a driving force.

The driving force is transmitted to the CVT 23 via the clutch 22, is shifted in the CVT 23, and is input to the transmission 24. If the number of revolutions per unit time (hereinafter, engine speed) of the engine output shaft (not shown) is less than a predetermined value (for example, 2000 rpm), the clutch 22 is disengaged, and the driving force is transmitted to the CVT 23 and the wheels 2. When the engine speed is equal to or larger than a threshold value, the clutch 22 is engaged, and the driving force is transmitted to the CVT 22. The CVT 23 is a V-belt type, and the transmission ratio of the CVT 23 changes continuously.

The transmission 24 can set a plurality of shifts such as a forward high-speed position (H), a forward low-speed position (L), a reverse position (R), and a neutral position (N). One of the plurality of shifts is selectively set according to the operation of the shift lever. An output shaft (not illustrated) of the transmission 24 is connected to the front propeller shaft 26F and the rear differential device 27R via the power take-out unit 25. The rear differential device 27R is connected to the rear wheels 2RR and 2RL via the right and left rear axles 28RR and 28RL. The front propeller shall 26F is connected to the front wheels 2FR and 2FL via the front differential device 27F and to right and left front axles 28FR and 28FL.

The power take-out unit 25 is provided with a two-wheel drive/four-wheel drive switching mechanism 25a. The two drive/four-wheel drive switching mechanism 25a is configured to switch between a two-wheel drive state in which a driving force generated by the engine 21 and output from the transmission 24 is transmitted to any two of the two front wheels 2FR and 2FL and the two rear wheels 2RR and 2RL and a four-wheel drive state in which the driving force is transmitted to the four wheels 2FR, 2FL, 2RR, and 2RL. In the present embodiment, in the two-wheel drive state, the drive wheels are the rear wheels 2RR and 2RL, and the driven wheels are the front wheels 2FR and 2FL. In the four-wheel drive state, the transmission 24 is connected to the front and rear differential devices 27F and 27R.

The rear differential device 27R distributes the driving force to the two rear wheels 2RR and 2RL. The rear differential device 27R is configured to be switchable between an open state in which the driving force is distributed according to the load acting on the two rear wheels 2RR and 2RL and a locked state in which the two rear wheels 2RR and 2RL are directly connected. In the open state, more driving force is distributed to one of the two rear wheels 2RR and 2RL on which a smaller load acts. In the locked state, the driving force is evenly distributed to the rear wheels 2RR and 2RL regardless of the loads of the two rear wheels 2RR and 2RL.

In the present embodiment, the front differential device 27F does not have such a differential lock function and is always in an open state. However, the front differential device 27F may also be configured to be switchable between the open state and the locked state as in the rear differential device 27R described above.

The brake device 29 brakes the wheel 2. The brake device 29 includes four friction brakes 29FR, 29FL, 29RR, and 29RL individually provided on the four wheels 2FR, 2FL, 2RR, and 2RL, respectively. The friction brakes 29FR, 29FL, 29RR, and 29RL can be operated independently of each other. The "brake device" may be a concept including an engine brake (see the second embodiment).

The utility vehicle includes a controller 40. Functions implemented by components described herein may be implemented in a circuitry or a processing circuitry, including a general purpose processor, an application specific processor, an integrated circuit, an application specific integrated circuit (ASICs), a central processing unit (CPU), a conventional circuit, and/or combinations thereof programmed to implement the described functions. A processor includes a transistor and other circuits, and is regarded as a circuitry or a processing circuitry. The processor may be a programmed processor that executes a program stored in a memory. Herein, a circuitry, a means, or a unit is hardware programmed to implement the described functions or hardware executing the functions. The hardware may be any hardware disclosed herein or any hardware programmed to implement the described functions or known to perform the described functions. In a case where the hardware is a processor regarded as a type of circuitry, the circuitry, means, or unit is a combination of hardware and software used to configure the hardware and/or the processor.

The controller 40 includes, as an example only, a CPU 41, a memory 42, and an input/output interface 43. The CPU 41 controls operations of various devices mounted on the utility vehicle 1, such as the brake device 29 and the information presentation device 15, according to detection results from various sensors according to a control program for assisting early cancellation of a stack. In light of the function of the controller 40, the controller 40 includes a stack determination unit 61, a mode switching unit 62, an engine control unit 63, a drive control unit 65, an information presentation control unit, and a map storage unit 66 (see FIG. 4).

Examples of the various sensors include an engine speed sensor 51, a gear position sensor 52, an accelerator operation amount sensor 53, a steering angle sensor 54, a wheel speed sensor 55, and a vehicle body speed sensor 56.

The engine speed sensor 51 detects the engine speed. The gear position sensor 52 detects a shift set in the transmission 24. The steering angle sensor 54 detects a steering angle, that is, an operation amount of the steering wheel 9. The accelerator operation amount sensor 53 detects a depression operation amount (hereinafter, accelerator operation amount) of the accelerator pedal 10.

The accelerator pedal 10 is an operation element operated by the driver to adjust the driving force generated by the engine 21 and thus the speed or acceleration of the utility vehicle 1. The controller 40 determines the target opening degree of the electronic throttle valve 31 according to the accelerator operation amount, and controls the operation of the valve actuator 31b so that the actual opening of the electronic throttle valve 31 becomes the target opening degree. The map storage unit 66 is realized by the memory 42 of the controller 40, and stores opening degree maps 44a and 44b (see FIG. 5) that define the correspondence relationship between the accelerator operation amount and the target opening degree. The opening degree map is prepared for each traveling mode. In the opening degree map 44a for the normal mode set at the time of normal traveling, the target opening degree is proportional to the accelerator operation amount, the target opening degree is fully closed when the accelerator operation amount is 0, and the target opening degree is fully opened when the accelerator operation amount is maximum.

The wheel speed sensors 55FR, 55FL, 55RR, and 55RL detect rotation speeds of the four wheels 2FR, 2FL, 2RR, and 2RL, respectively. The vehicle body speed sensor 56 detects the vehicle body speed of the utility vehicle 1 with respect to the ground without depending on the rotation speeds of the engine output shaft 21, the wheels 2, and the rotary elements constituting a power transmission path. For example, the vehicle body speed sensor 56 is realized by a receiver 56a of a satellite PNT system, an inertial measurement unit (IMU) 56b, or a combination thereof. When the wheel 2 is gripped on the road surface, the detection results of the wheel speed sensors 55FR, 55FL, 55RR, and 55RL are easily and accurately converted into the vehicle body speed. With reference to the detection result of the vehicle body speed sensor 56, it is possible to easily determine the slip or the lock of the wheel 2.

Figure 4:
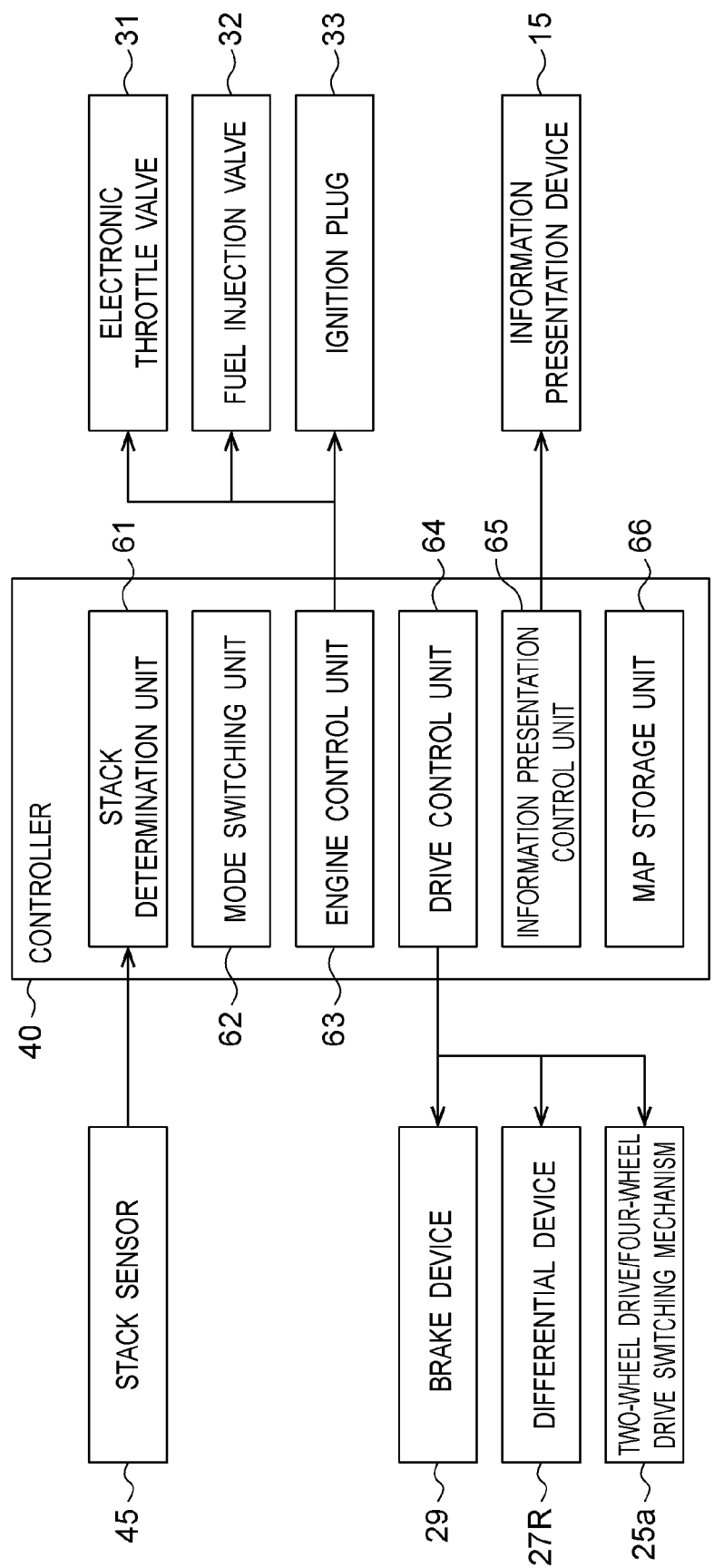
FIG. 4 is a block diagram illustrating the control system illustrated in FIG. 3.

Referring to FIG. 4, the utility vehicle 1 includes a stack sensor 45 for detecting whether a "stack" is generated in the utility vehicle 1. The stack determination unit 61 determines the presence or absence of a stack on the basis of the detection result of the stack sensor 45. The "stack" occurs when the differential devices 27F and 27R are in the open state. The "stack" refers to a phenomenon in which a load acting on one of the drive wheels approaches zero because the drive wheel floats from a road surface or is fitted in a muddy ground or sandy ground, most of the driving force is distributed only to the drive wheel from the differentia devices 27F and 27R, and the driving force is not appropriately distributed to the other drive wheel, so that the utility vehicle 1 is hindered from traveling. In the present specification, a wheel in which most of the driving force is distributed and spinning while a stack occurs is referred to as a "stack wheel".

The term "stack" is a term that includes not only a result that the utility vehicle 1 is presented from proceeding but also a cause of such a result. The stack sensor 45 does not need to detect such a "stack" itself. The stack sensor 45 only needs to detect a plurality of pieces of information necessary for determining the presence or absence of a stack in the stack determination unit 61, and includes a plurality of sensors that each detect such a plurality of pieces of information.

When the utility vehicle 1 includes the vehicle body speed sensor 56, the stack sensor 45 may include the wheel speed sensor 55 and the vehicle body speed sensor 56. In this case, the stack determination unit 61 may determine that a stack has occurred when both a condition that the detection value of the vehicle body speed sensor 56 is less than a threshold value near 0 and a condition that the ratio or difference between the rotation speed of one of the drive wheels and the rotation speed of the other drive wheel is equal to or larger then the threshold value are satisfied.

The stack sensor 45 may include the engine speed sensor 51 and the gear position sensor 52. In this case, the stack determination unit 61 estimates the vehicle body speed based on the engine speed and the shift under the assumption that the wheel 2 is gripped, and compares the estimated value with the detection value of the vehicle body speed sensor 56. If the detected value is smaller than the estimated value and the ratio or difference between the estimated value and the detected value is equal to or larger than a threshold value, the controller 40 may determine that a stack has occurred.

When the stack determination unit 61 estimates the vehicle body speed in this manner, the estimated value does not necessarily need to be compared with the detection value of the vehicle body speed sensor 56. That is, the stack sensor 45 may include the engine speed sensor 51, the gear position sensor 52, and the wheel speed sensor 55. In this case, the utility vehicle 1 may not include the vehicle body speed sensor 56. The stack determination unit 61 extracts the lowest one of the detected rotation speeds as a comparison target with the estimated value, and converts the detected rotation speed into the vehicle body speed based on the circumferential length of the wheel 2. The stack determination unit 61 compares the estimated value with the converted value, and thereafter, performs the same determination processing as described above.

In the two-wheel drive state, the rotation speed of the driven wheel is useful as original data converted into the vehicle body speed. In the two-wheel drive state, the presence or absence of a stack may be determined based on a comparison between any one or the average of the rotation speeds of the driven wheels (front wheels) and the lower one of the rotation speeds of the drive wheels (rear wheels).

The mode switching unit 62 switches the traveling mode. The traveling mode includes, for example, a normal mode set during normal travel and a stack cancellation mode set while it is determined that a stack has occurred.

The engine control unit 63 drives the electronic throttle valve 31, the fuel injection valve 32, and the ignition plug 33, and controls the driving force generated in the engine 21. The drive control unit 64 controls the operations of the brake device 29, the differential device 27R, and the two-wheel/four-wheel switching mechanism 25a. The information presentation control unit 65 determines information to be presented by the information presentation device 15, and controls the information presentation device 15 such that the determined information is presented by the information presentation device 15.

Figure 6:
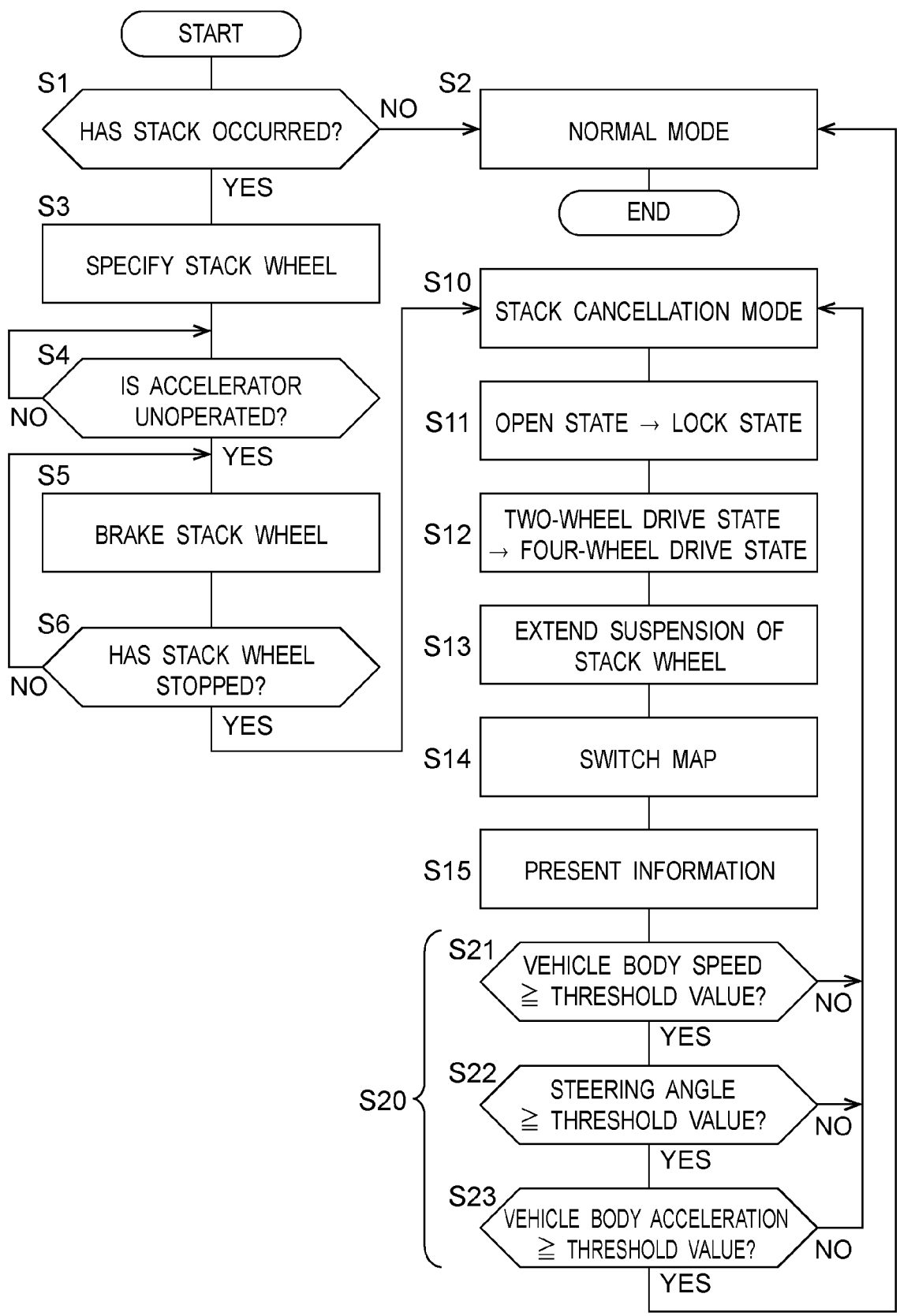
FIG. 6 is a flowchart illustrating processing executed by the control system illustrated in FIG. 3.

With reference to FIG. 6, processing for early stack cancellation executed in the controller 40 will be described. The processing illustrated in FIG. 6 is started when the traveling mode is the normal mode and the differential devices 27F and 27R are in the open state. The controller 40 determines whether a stack has occurred in the utility vehicle 1 based on the detection result by the stack sensor 45 (S1). Examples of the configuration and determination logic of the stack sensor 45 are as described above. When no stack has occurred (S1: N), the traveling mode is maintained in the normal mode (S2).

When it is determined that a stack has occurred (S1: Y), the controller 40 specifies a stack wheel (S3). When determining that a stack has occurred, the controller 40 can specify the stack wheel and wheels other than the stack wheel based the detection results of the four wheel speed sensors 55. For example, an average of the rotation speeds of the four wheels 2 may be taken, and a wheel whose rotation speed exceeds the average value may be specified as a stack wheel.

Next, the controller 40 monitors the detection result of the accelerator operation amount sensor 53 and determines whether the accelerator pedal 10 is unoperated (S4). In the present embodiment, even though the accelerator pedal 10 is operated by the driver and the electronic throttle valve 31 is controlled so as to generate the driving force corresponding to the operation amount, by detecting the idling of the stack wheel and the stop of the utility vehicle 1, the controller 40 determines that a stack has occurred. In other words, at a time point when it is determined that a stack has occurred, the accelerator pedal 10 is in an operated state. After determining that a stack has occurred, the controller 40 waits until the driver releases the accelerator operation (S4: N→S4).

When it is determined that the accelerator pedal 10 is unoperated (S4: Y), the controller 40 activates the brake device 29 to reduce the rotation speed of a stack wheel (S5). In the present embodiment, the friction brakes 29FR, 29FL, 29RR, and 29RL are individually provided on the four wheels 2, and the stack wheel is already specified in the controller 40. Therefore, the controller 40 operates the friction brake corresponding to the stack wheel in the brake device 29 so that the braking force is applied only to the stack wheel. The controller 40 monitors the detection result of the wheel speed sensor 55 corresponding to the stack wheel and deformities whether the stack wheel has stopped (S6). When the stop of the stack wheel is not detected (S6: NO), the operation of the brake device 29 is continued (S5).

When determining that the stack wheel has stopped (S6: Y), the controller 40 shifts the traveling mode from the normal mode to the "stack cancellation mode" (S10). The stack cancellation mode is a dedicated traveling mode for supporting early cancellation of a stack, and the state of the drive system is changed.

Specifically, the controller 40 switches the rear differential device 27R from the open state to the locked state (S11). In the present embodiment, the rear differential device 27R is configured to be capable of electronically switching the state without depending on the operation of the operation element. Therefore, the controller 40 switches the rear differential device 27R to the locked state without prompting the driver to perform a switching operation. The controller 40 further operates the two-wheel drive/four-wheel drive switching mechanism 25a to switch the two-wheel drive state to the four-wheel drive state (S12). Furthermore, the controller 40 extends the stroke of the suspension 3 corresponding to the stack wheel (S13).

Figure 5:
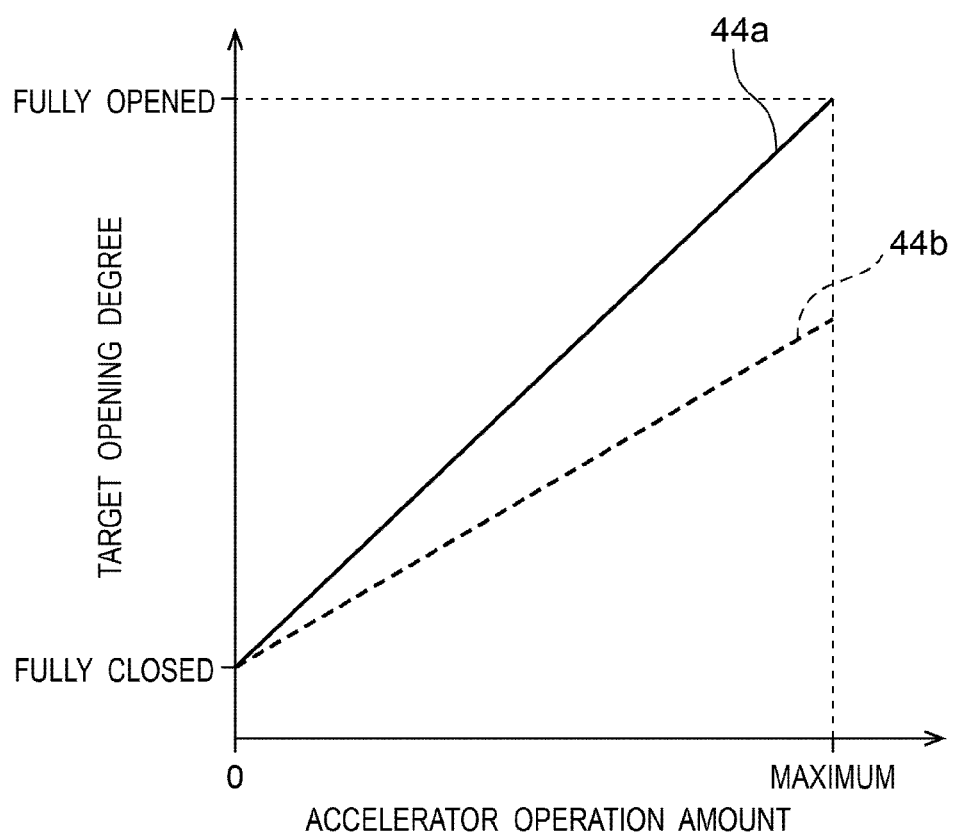
FIG. 5 is an opening degree map.

Next, the controller 40 switches the opening degree map 44 to be referred from that for the normal mode to that for the stack cancellation mode (S14). As illustrated in FIG. 5, the opening degree map 44b for the stack cancellation mode is set such that the target opening degree in the stack cancellation mode is lower than the target opening degree in the normal mode under the condition that the accelerator operation amount is the same. For example, in the opening degree map 44b for the stack cancellation mode, although the accelerator operation amount is proportional to the target opening degree, the inclination thereof is smaller than that of the opening degree map 44a for the normal mode, and the target opening degree is set to the intermediate opening less than the full opening even when the accelerator operation amount is the maximum.

The controller 40 then operates the information presentation device 15 to present, to the driver via information presentation device 15, information indicating that a stack has occurred as well as information for guiding an operation necessary cancelling the stack (step S15). In the present embodiment, since the stack wheel is already stopped, the operation of the brake pedal 11 is unnecessary. In addition, since the rear differential device 27R has been switched from the open state to the differential lock state and the drive system has been switched from the two-wheel drive state to the four-wheel drive state, a switching operation is also necessary. Therefore, the driver is presented with information indicating that the stack is currently generated and information indicating that the differential lock state and the four-wheel drive state are set. Then, information prompting the user to slowly depress the accelerator pedal 10 is presented. As a result, the driver can be prompted to perform an operation along the guide.

When the differential device 27R is switched from the open state to the differential lock state, the driving force is also distributed to the drive wheel to which the driving force has not been distributed. Therefore, the stack can be easily canceled. In the four-wheel drive state, the drive wheel is changed from two wheels to four wheels, and the distribution target of the driving force is doubled. Therefore, the number of driving wheels gripped on the road surface increases, and the probability that the stack is canceled early increases. When the stroke of the stack wheel is extended, it is expected that the floating of the stack wheel from the road surface is canceled or the load acting on the stack wheel increases as the ground load of the stack wheel increases. Therefore, the probability that the stack is canceled early increases. Then, the increase in the driving force generated in the engine 21 becomes slow with respect to the accelerator operation. If it remains normal, the tidying force is excessively generated, and idling may occur again. The generation of the excessive driving force is suppressed without requiring the delicate accelerator work, and the appropriate driving force is easily transmitted to the driving wheel gripped on the road surface, and the stack is easily cancelled.

The controller 40 determines whether the stack has been canceled (S20). The stack cancellation mode is maintained until it is determined that the stack has not been canceled (S10). When determining that the stack has been canceled, the controller 40 returns the traveling mode from the stack cancellation mode to the normal mode (S2). When the mode is returned to the normal mode, the differential lock state returns to the open state. The suspension stroke of the stack wheel is shortened and restored. The opening degree map is switched from that for the stack cancellation mode to that for the normal mode. The switching between the four-wheel drive state and the two-wheel drive state may or may not be performed.

In order to determine whether the stack has been canceled, the controller 40 determines whether one or more stack cancellation conditions are satisfied (S21 to S23). For example, the controller 40 determines three stack cancellation conditions, and determines that the stack has been canceled when all of the three conditions are satisfied. When any one of the conditions is not satisfied, the controller 40 determines that the stack has not been canceled. However, it may be determined that the stack has been canceled when any one of the three conditions is satisfied.

The first condition is a condition that the vehicle body speed is equal to or larger than the threshold value (S21). The second condition is a condition that the steering angle is equal to or larger than the threshold value (S22). The third condition is a condition that the vehicle body acceleration is equal to or larger than the threshold value (S23). The steering angle is detected by the steering angle sensor 54. The vehicle body acceleration is derived by calculating a change rate of the detection value of the vehicle body speed. By appropriately setting threshold value to be compared with the vehicle body speed, it is possible to accurately determine whether the stack has been canceled. The steering operation and the acceleration/deceleration operation are performed during traveling. By including these in the conditions, it is possible to accurately determine whether the stack has been cancelled.

According to the above embodiment, when it is determined that a stack has occurred as the utility vehicle 1, the stack wheels are brake-controlled to stop idling. Therefore, regardless of whether the driver recognizes the occurrence of the stack, the operation for positively stopping the idling is started. Therefore, the period (hereinafter, idling period) from the generation of the stack to the stop of the idling of the stack wheel is shortened as compared with the case where the driver who recognizes the stack operates the brake pedal to stop the idling. The operation (for example, switching from the open state to the differential lock state, and the like) for canceling the stack is started after the idling is stopped. When the idling period is shortened, the start timing of the operation for canceling the stack is also advanced. Therefore, it is possible to assist early cancellation of the stack.

When determining that a stack has occurred, the controller 40 waits until the accelerator pedal 10 is unoperated, and starts braking of the stack wheel. Thus, the friction brake corresponding to the stack wheel can be protected. The controller 40 waits for the stack wheel to stop and switches the state of the differential device 27R. Accordingly, the constituent members of the utility vehicle 1 can be protected. In this manner, both protection of the device mounted on the utility vehicle 1 and early cancellation of the stack can be achieved.

In the present embodiment, the state switching of the rear differential device 27R and the switching of two-wheel drive/four-wheel drive are automatically performed by the controller 40. The operation to be performed by the driver for cancelling the stack is reduced, and the stack can be easily cancelled quickly regardless of the skill level of the driver.

Figure 7:
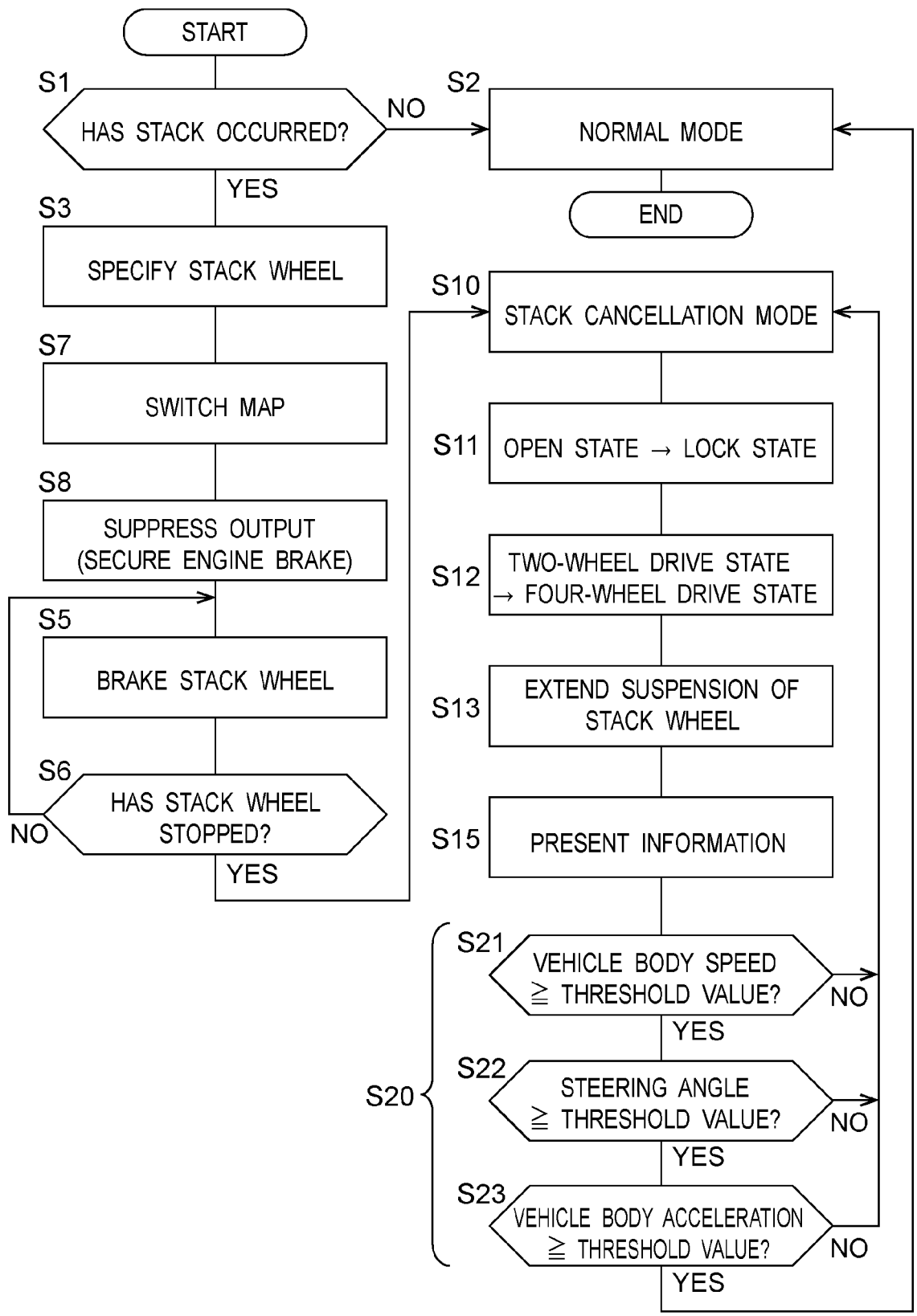
FIG. 7 is a flowchart illustrating processing executed by a control system of a utility vehicle according to a second embodiment.
Figure 8:
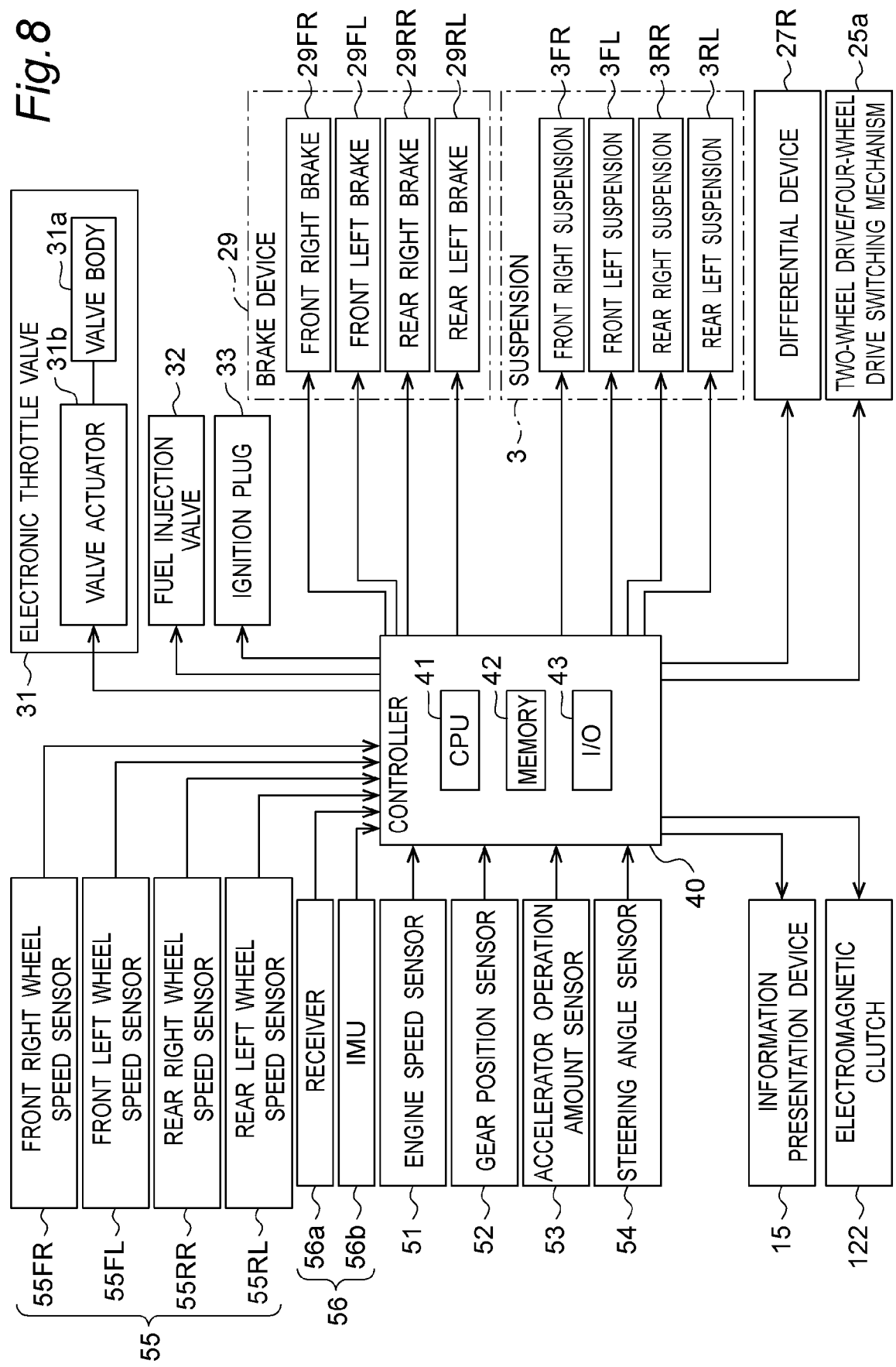
FIG. 8 is a conceptual diagram of a control system of a utility vehicle according to a third embodiment.
Figure 9:
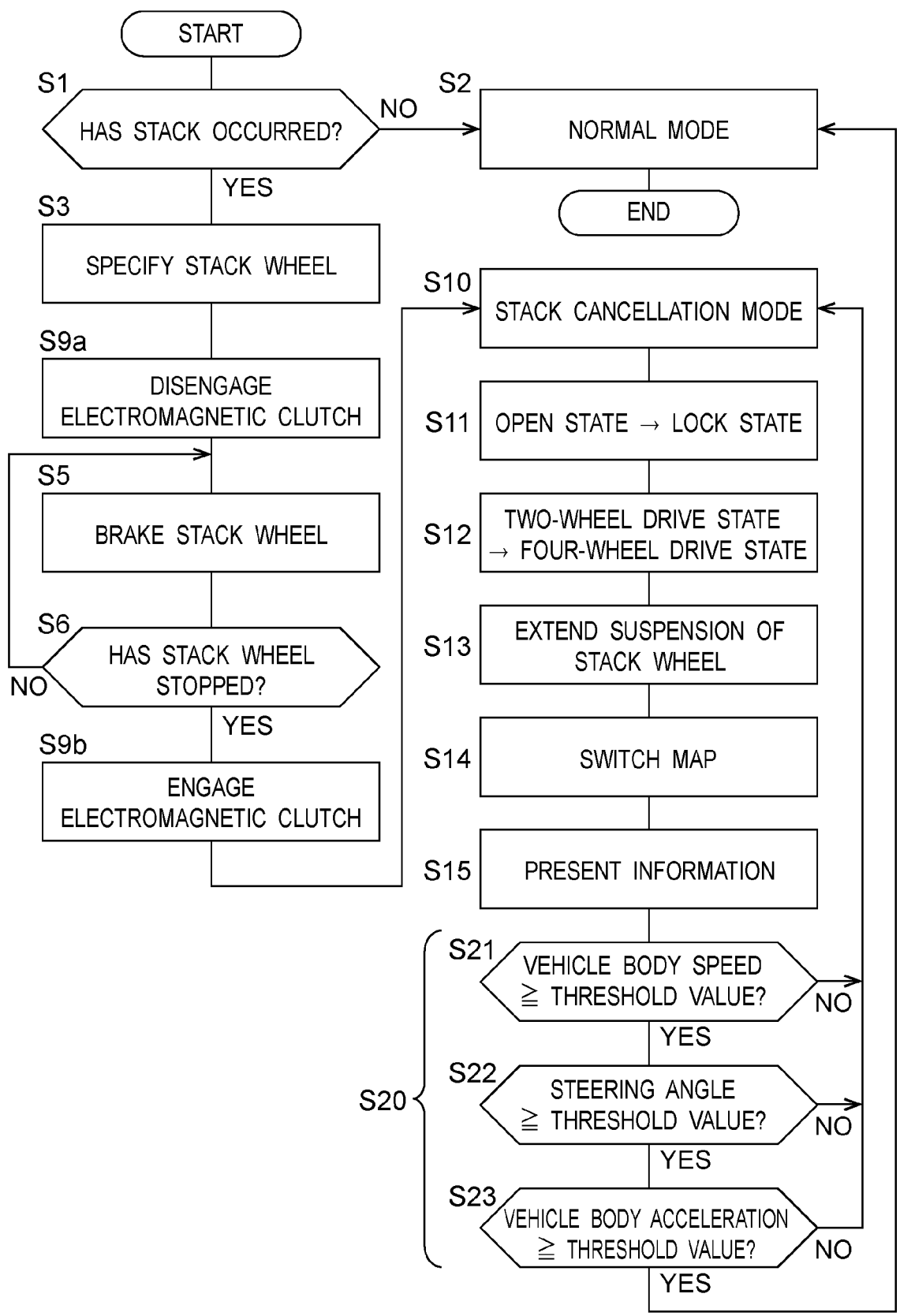
FIG. 9 is a flowchart illustrating processing executed by the control system illustrated in FIG. 8.

Next, the second embodiment will be described with reference to FIG. 7, focusing on differences from the above embodiment.

In the present embodiment, when it is determined that a stack has occurred, regardless of the operation state of the accelerator pedal 10, the brake corresponding to the stack wheel is operated to brake the stack wheel. In other words, the braking of the stack wheel is started without waiting for the accelerator pedal 10 to be unoperated. Instead, the opening degree map 44 is switched from that for the normal mode to that for the stack cancellation mode (S7). As a result, even when the accelerator pedal 10 is in the operating state, the driving force generated in the engine 21 is suppressed, and the idling period can be shortened.

Furthermore, the controller 40 executes fuel cut control and cylinder shut-off control in order to reduce the engine output until the idling of the stack wheel stops (S8). At the same time, the controller 40 may control the electronic throttle valve so that the throttle opening degree is fully closed. As a result, the engine braking force can be applied to the stack wheel. As described above, the "brake device 30" may be a concept including an engine brake it addition to the friction brake provided for each wheel. As a result, the idling period can be further shortened.

Next, a third embodiment will be described with reference to FIGS. and 9, focusing on differences from the above embodiments.

In the present embodiment, an electromagnetic clutch 122 is interposed on a power transmission path from the engine 21 to the power take-out unit 25. In this case, when determining that a stack has occurred, the controller 40 disengages the electromagnetic clutch 122 to cut off the power transmission between the engine 21 and the wheels 2 regardless of the operation state of the accelerator pedal 10 (S9a). Then, the friction brake corresponding to the stack wheel is operated to brake the stack wheel (S5). When the stack wheel stops, the electromagnetic clutch 122 is brought into the engaged state again to transmit the driving force generated in the engine 21 to the driving wheel (S9b), and thereafter, the traveling mode shifts to the stack cancellation mode (S10). As a result, the idling period can be shortened, and the brake corresponding to the stack wheel can be protected.

Figure 10:
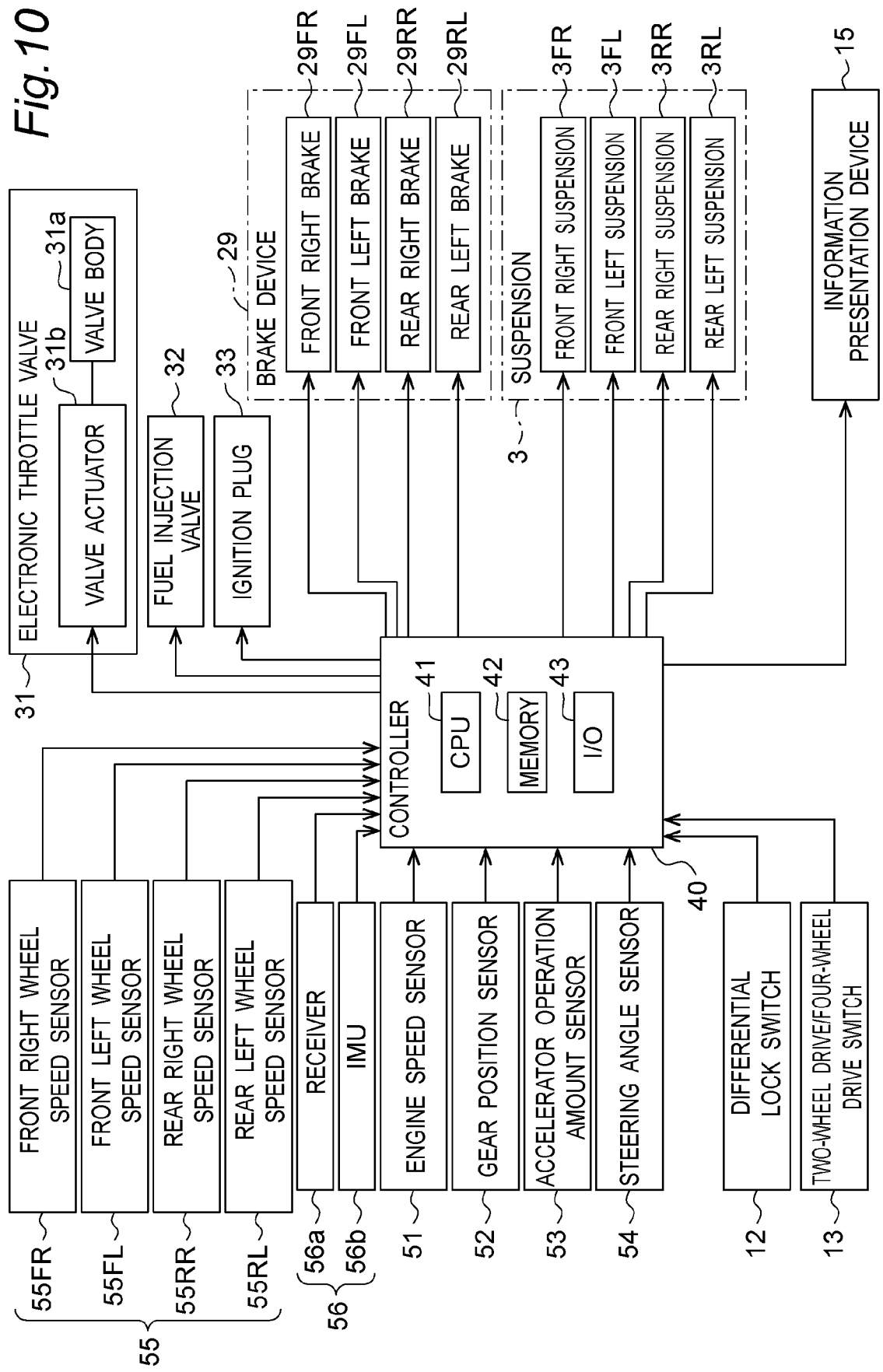
FIG. 10 is a conceptual diagram of a control system of a utility vehicle according to a fourth embodiment.
Figure 11:
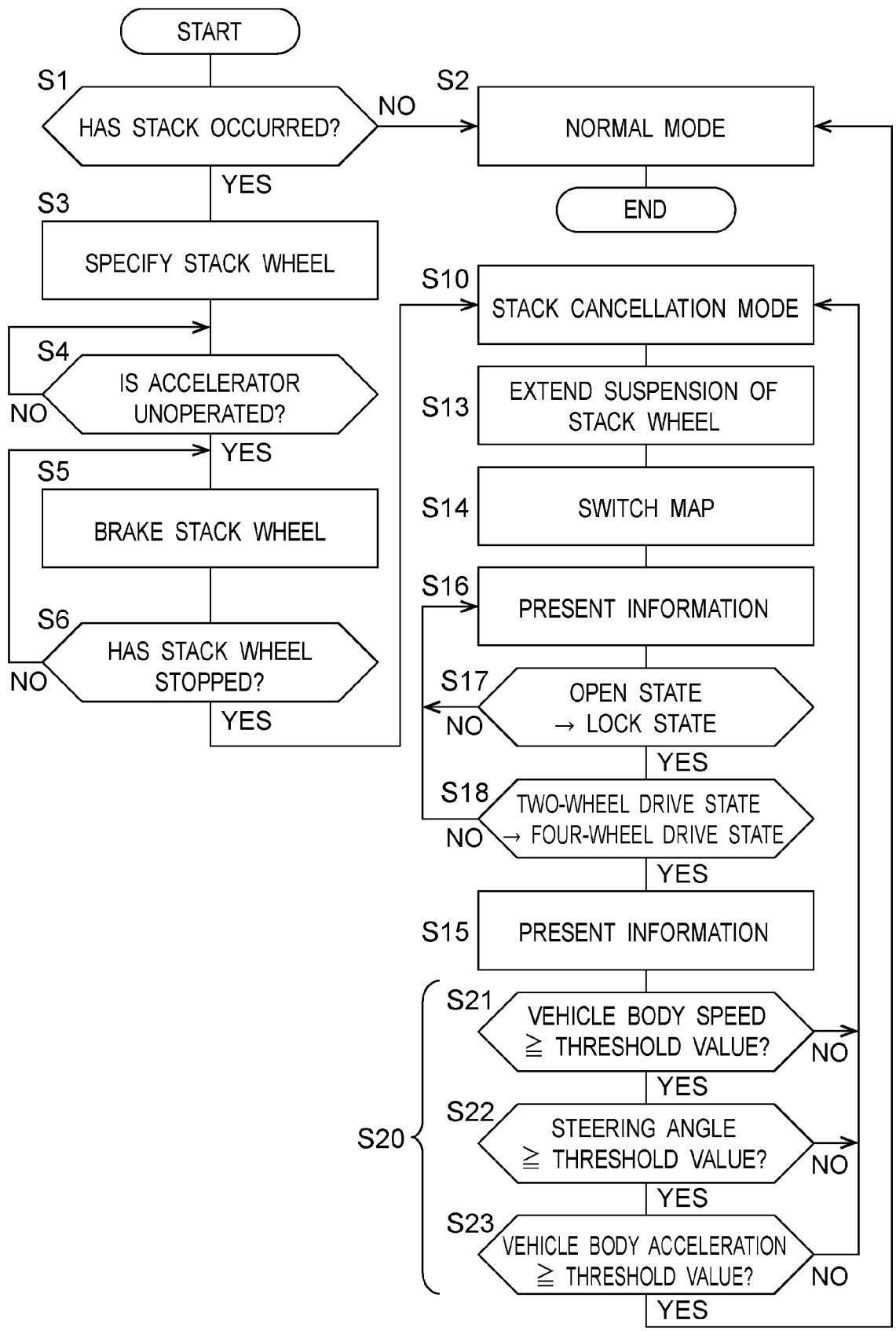
FIG. 11 is a flowchart illustrating processing executed by the control system illustrated in FIG. 10.

Next, a fourth embodiment will be described with reference to FIGS. 10 and 11, focusing on differences from the fourth embodiment.

In the present embodiment, the state switching of the differential device and the switching between two-wheel drive/four-wheel drive are not automatically performed by the controller. Instead, when the stack wheel stops, the controller 40 causes the information presentation device 15 to present information prompting the driver to operate the differential lock switch 12 so as to switch the differential device 27R from the open state to the differential lock state (S16). The controller 40 causes the information presentation device 15 to present information prompting the driver to operate the two-wheel drive/four-wheel drive switching mechanism 25a to 13 so as to switch the state from the two-wheel drive state to the four-wheel drive state (S16).

When detecting that these operations have been performed (S17: Y and S18: Y), the controller 40 causes the information presentation device 15 to present information prompting the driver to operate the accelerator pedal 10 in the same manner as in the above embodiments (S15). When the driver performs an operation according to the guidance presented from the information presentation device 15, the stack can be canceled regardless of the skill level of the driver. Also in the present embodiment, similarly to the above embodiment, the idling period is shortened, and it is possible to support early cancellation of the stack.

In this case, the switching of the opening degree map (S14) and the extension of the suspension stroke (S13) may be performed before or while the driver is prompted to perform the switching operation. Although the driver is prompted to perform both the differential switching and the two-wheel drive/four-wheel drive switching, only one of the operations may be presented according to the situation.

Although the embodiments of the present invention have been described so far, the above configuration can be appropriately changed, added, or deleted within the scope of the gist of the present invention.

Although the four friction brakes are configured to be operable independently of each other, the four friction brakes may be interlocked, the two friction brakes for the front wheel may be interlocked, the two friction brakes for the rear wheel may be interlocked, and the front wheel brakes and the rear wheel brakes may be configured to be operable independently of each other.

As in the first and fourth embodiments, in the case of waiting for the accelerator pedal to be unoperated after generation of a stack, the normal mode may be restored when the ground speed of the vehicle body of the utility vehicle becomes equal to or larger than a predetermined value before the accelerator pedal is unoperated. Sine the driver cancels the stack with his/her skill, control such as braking of the stack wheel is unnecessary. The driver can drive the utility vehicle 1 in a normal travel operation.

The traveling mode is not limited to the above two modes, and a traction control mode or the like for preventing slip may be settable separately from the above two modes. The driving source that generates the driving force is not limited to only the engine 21, and may be configured by an electric motor instead of the engine 21 or in addition to the engine 21. That is, the utility vehicle 1 may be a hybrid vehicle or an electric vehicle.

What is claimed is:

1. A utility vehicle comprising:
a plurality of wheels;
a differential device configured to be switchable between an open state in which a driving force is distributed to the plurality of wheels and a locked state in which the plurality of wheels are directly connected;
a brake device that brakes the plurality of wheels;
a stack sensor for detecting whether a stack is generated in the vehicle; and
a controller configured to:
determine whether a stack is generated in the vehicle based on a detection result of the stack sensor when the differential device is in the open state; and
operate, when it is determined that the stack has occurred, at least the brake device to decrease a rotation speed of a stack wheel which is a wheel that is idling.

2. The utility vehicle according to claim 1, wherein, when determining that the stack has occurred, the controller operates the brake device until the stack sensor detects a stop of the stack wheel.

3. The utility vehicle according to claim 1, wherein, when the stack sensor detects a stop of the stack wheel after determining that the stack has occurred, the controller sets a traveling mode to a stack exit mode.

4. The utility vehicle according to claim 3, wherein the controller switches the differential device from the open state to the locked state in the stack exit mode.

5. The utility vehicle according to claim 3, further comprising a two-wheel drive/four-wheel drive switching mechanism that switches between a two-wheel drive state in which the driving force is transmitted to any two of two front wheels and two rear wheels included in the plurality of wheels and a four-wheel drive state in which the driving force is transmitted to all of the two front wheels and the two rear wheels,
wherein the controller operates the two-wheel drive/four-wheel drive switching mechanism to set the four-wheel drive state in the stack exit mode.

6. The utility vehicle according to claim 5, wherein the controller sets the four-wheel drive state and switches the differential device from the open state to the locked state in the stack exit mode.

7. The utility vehicle according to claim 3, further comprising an information presentation device that presents information to the driver,
wherein the controller causes the information presentation device to present information for guiding an operation for stack exit in the stack exit mode.

8. The utility vehicle according to claim 3, further comprising:
an accelerator operation member operated by a driver to adjust the driving force; and
an accelerator operation amount sensor that detects an operation amount of the accelerator operation number,
wherein the controller reduces the driving force generated according to the operation amount of the accelerator operation member in the stack exit mode as compared with a normal traveling mode.

9. The utility vehicle according to claim 3, further comprising a plurality of suspension devices individually provided on the plurality of wheels, the suspension devices having variable strokes,
wherein, in the stack exit mode, the controller operates the suspension device corresponding to the stack wheel such that the stroke is extended.

10. The utility vehicle according to claim 3, wherein the controller ends the stack exit mode when determining an exit of the vehicle from the stack based on a detection result of the stack sensor after setting the stack mode.

11. The utility vehicle according to claim 10, wherein the controller ends the stack exit mode when a vehicle speed becomes equal to or larger than a predetermined threshold value.

12. The utility vehicle according to claim 1, wherein the controller controls the driving force to generate an engine braking force when determining that the stack has occurred.

13. The utility vehicle according to claim 1, further comprising:
an accelerator operation member operated by a driver to adjust the driving force; and
an accelerator operation amount sensor that detects an operation amount of the accelerator operation member,
wherein, when determining that the stack has occurred, the controller reduces the driving force generated according to the operation amount of the accelerator operation member than a normal driving force and activates the brake device.

14. The utility vehicle according to claim 1, further comprising:
an accelerator operation member operated by a driver to adjust the driving force; and
an accelerator operation amount sensor that detects an operation amount of the accelerator operation member,
wherein, when determining that the stack has occurred, the controller determines that the accelerator operation member is unoperated based on a detection result by the accelerator operation amount sensor, and then operates the brake device.

15. The utility vehicle according to claim 14, wherein the controller returns a traveling mode to a normal traveling mode when determining that the vehicle can travel before the accelerator operation member is unoperated after determining that the stack has occurred.

16. The utility vehicle according to claim 1,
wherein the brake device is configured to be able to brake the plurality of wheels individually, and
the controller is configured to:
specify, when determining that the stack has occurred, the stack wheel from the plurality of wheels; and
operate the brake device such that a braking force is applied only to the specified stack wheel.

17. The utility vehicle according to claim 1, wherein the stack sensor includes a wheel speed sensor that detects a rotation speed of each of the plurality of wheels.

18. The utility vehicle according to claim 17,
wherein the stack sensor includes a vehicle body speed sensor that detects a ground speed of a vehicle body of the vehicle, and
the vehicle body speed sensor includes at least one of a receiver of a satellite positioning system and an inertial measurement unit.

* * * * *